(12) United States Patent
Campaigne

(10) Patent No.: US 7,153,211 B2
(45) Date of Patent: Dec. 26, 2006

(54) METHOD AND SYSTEM TO OPTIMIZE GROUP ACHIEVEMENT EMPLOYING GROUP MEMBERS' COLLECTIVE INTELLIGENCE

(75) Inventor: Philip James Campaigne, Harvard, MA (US)

(73) Assignee: Bect Power, Inc., Harvard, MA (US)

( * ) Notice: Subject to any disclaimer, the term of this patent is extended or adjusted under 35 U.S.C. 154(b) by 598 days.

(21) Appl. No.: 09/902,333

(22) Filed: Jul. 10, 2001

(65) Prior Publication Data

US 2003/0073493 A1   Apr. 17, 2003

(51) Int. Cl.
  A63F 13/00   (2006.01)
  A63F 9/24    (2006.01)
  G06F 17/00   (2006.01)
  G06F 19/00   (2006.01)
  G06F 155/00  (2006.01)

(52) U.S. Cl. .................... 463/40; 463/42; 463/43; 700/91; 700/92

(58) Field of Classification Search ........... 463/40, 463/1, 41, 42, 43, 59, 4, 2, 3; 700/90, 91, 700/92, 93; 273/317.1, 317.2, 317.3, 317.4–317.6, 273/108.1, 108.3, 108.4; 434/350
See application file for complete search history.

(56) References Cited

U.S. PATENT DOCUMENTS

| | | | | |
|---|---|---|---|---|
| 4,592,546 A | * | 6/1986 | Fascenda et al. | 463/29 |
| 4,722,526 A | * | 2/1988 | Tovar et al. | 463/9 |
| 5,013,038 A | * | 5/1991 | Luxenberg et al. | 463/42 |
| 5,083,271 A | * | 1/1992 | Thacher et al. | 700/92 |
| 5,114,155 A | * | 5/1992 | Tillery et al. | 273/371 |
| 5,462,275 A | * | 10/1995 | Lowe et al. | 463/4 |
| 5,695,401 A | * | 12/1997 | Lowe et al. | 463/4 |
| 5,846,132 A | * | 12/1998 | Junkin | 463/42 |
| 5,860,862 A | * | 1/1999 | Junkin | 463/40 |
| 5,936,661 A | * | 8/1999 | Trew | 725/114 |
| 5,950,172 A | * | 9/1999 | Klingman | 705/26 |
| 6,015,345 A | * | 1/2000 | Kail | 463/16 |
| 6,071,002 A | * | 6/2000 | Katayama | 434/257 |
| 6,080,063 A | * | 6/2000 | Khosla | 463/42 |
| 6,135,881 A | * | 10/2000 | Abbott et al. | 463/3 |
| 6,148,242 A | * | 11/2000 | Descalzi et al. | 700/90 |
| 6,193,610 B1 | * | 2/2001 | Junkin | 463/40 |
| 6,240,415 B1 | * | 5/2001 | Blumberg | 707/9 |

(Continued)

OTHER PUBLICATIONS

Cedric Sanza, Cyril Panatier, Herve Luga, Yves Duthen; Adaptive Behavior for Cooperation: A virtual Reality Application; Sep. 1999; Proceedings of the 1999 IEEE; (0-7803-5841-4/99); pp. 76-81.*

(Continued)

Primary Examiner—Xuan M. Thai
Assistant Examiner—Binh-An D. Nguyen

(57) ABSTRACT

A method and system for a plurality of reporters to collectively self-organize, for the purpose of identifying, measuring and recording team-member activity that is causal to team achievement. The method includes steps of role selection, information discovery, information reporting and information aggregation of team-member activity that is causal to team achievement. It includes means for creating a common perspective among reporters, a common means to judge the value of team-members' contributions, means for collective self-organizing and self-training by reporters, and means for valuing reporters' contributions to the reporting process. One preferred embodiment is a game that enables a large group of humans to determine the critical few actions and collaborations that lead to winning a basketball game viewed live, via TV or internet broadcast. Another preferred embodiment is a game for maximizing the selling activity of a commercial sales group.

12 Claims, 12 Drawing Sheets

U.S. PATENT DOCUMENTS

| | | | |
|---|---|---|---|
| 6,250,930 B1* | 6/2001 | Mintz | 434/323 |
| 6,287,199 B1* | 9/2001 | McKeown et al. | 463/40 |
| 6,292,706 B1* | 9/2001 | Birch et al. | 700/91 |
| 6,311,041 B1* | 10/2001 | Goodyear | 434/350 |
| 6,352,479 B1* | 3/2002 | Sparks, II | 463/42 |
| 6,394,895 B1* | 5/2002 | Mino | 463/3 |
| 6,402,618 B1* | 6/2002 | Reed et al. | 463/40 |
| 6,406,371 B1* | 6/2002 | Baba et al. | 463/42 |
| 6,425,828 B1* | 7/2002 | Walker et al. | 463/42 |
| 6,431,985 B1* | 8/2002 | Kim | 463/42 |
| 6,439,997 B1* | 8/2002 | Brasseur et al. | 463/40 |
| 6,496,812 B1* | 12/2002 | Campaigne et al. | 706/16 |
| 6,594,355 B1* | 7/2003 | Deo et al. | 379/219 |
| 6,609,096 B1* | 8/2003 | De Bonet et al. | 704/500 |
| 6,616,529 B1* | 9/2003 | Qian et al. | 463/1 |
| 6,628,918 B1* | 9/2003 | Roschelle et al. | 434/350 |
| 6,650,903 B1* | 11/2003 | Inselberg | 455/517 |
| 6,669,565 B1* | 12/2003 | Liegey | 463/42 |
| 6,688,978 B1* | 2/2004 | Herman | 463/25 |
| 6,741,833 B1* | 5/2004 | McCormick et al. | 434/350 |
| 2001/0031454 A1* | 10/2001 | Mintz | 434/322 |
| 2002/0013631 A1* | 1/2002 | Parunak et al. | 700/28 |
| 2002/0034980 A1* | 3/2002 | Lemmons et al. | 463/40 |
| 2002/0090997 A1* | 7/2002 | Bailey | 463/42 |
| 2003/0153386 A1* | 8/2003 | Lydon et al. | 463/40 |

OTHER PUBLICATIONS

Nikatas M. Sgouros; Supporting Audience and Player Interaction During Interactive Media Performances; Aug. 2000; IEEE (0-7803-6536-4/00); pp. 1367-1370.*

Proceedings of the 6th International Conference on Artificial Life at UCLA, Jun. 26-29, 1998; Symbiotic Intelligence : Self-Organizers Knowledge on Distributed Networks Driven by Human Interaction.

* cited by examiner

FIG. 1    REPORTER Learning Process

FIG. 2    Team-member Learning Process

FIG. 4  Reporting System Components

FIG. 5 Representative ASPECT Report

FIG. 6 Reporting System/PLAYER Interaction

FIG. 7    Reporting System Configuration

FIG. 9 Reporter Administration Process
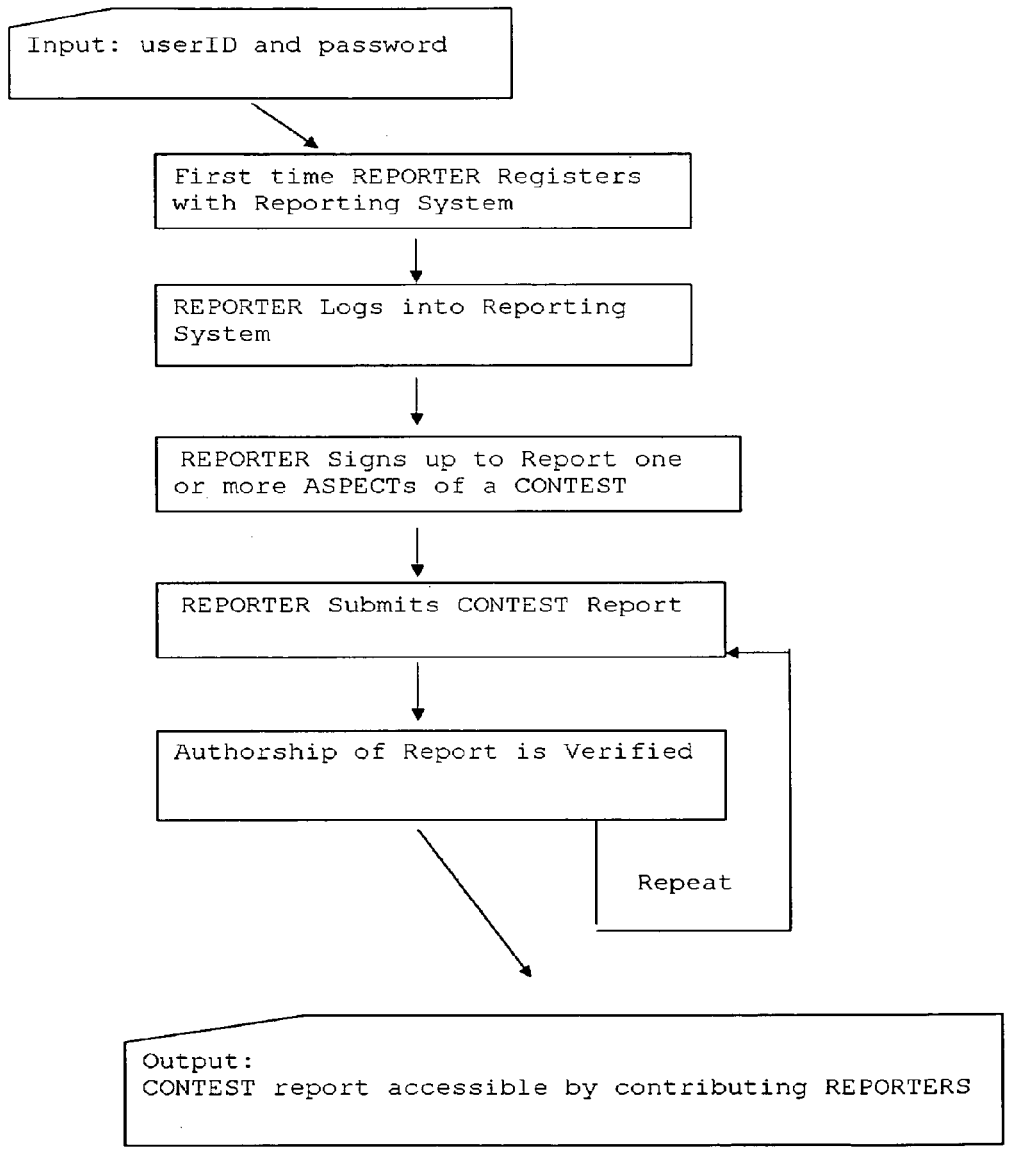

FIG. 10 Report Management Process Sequence
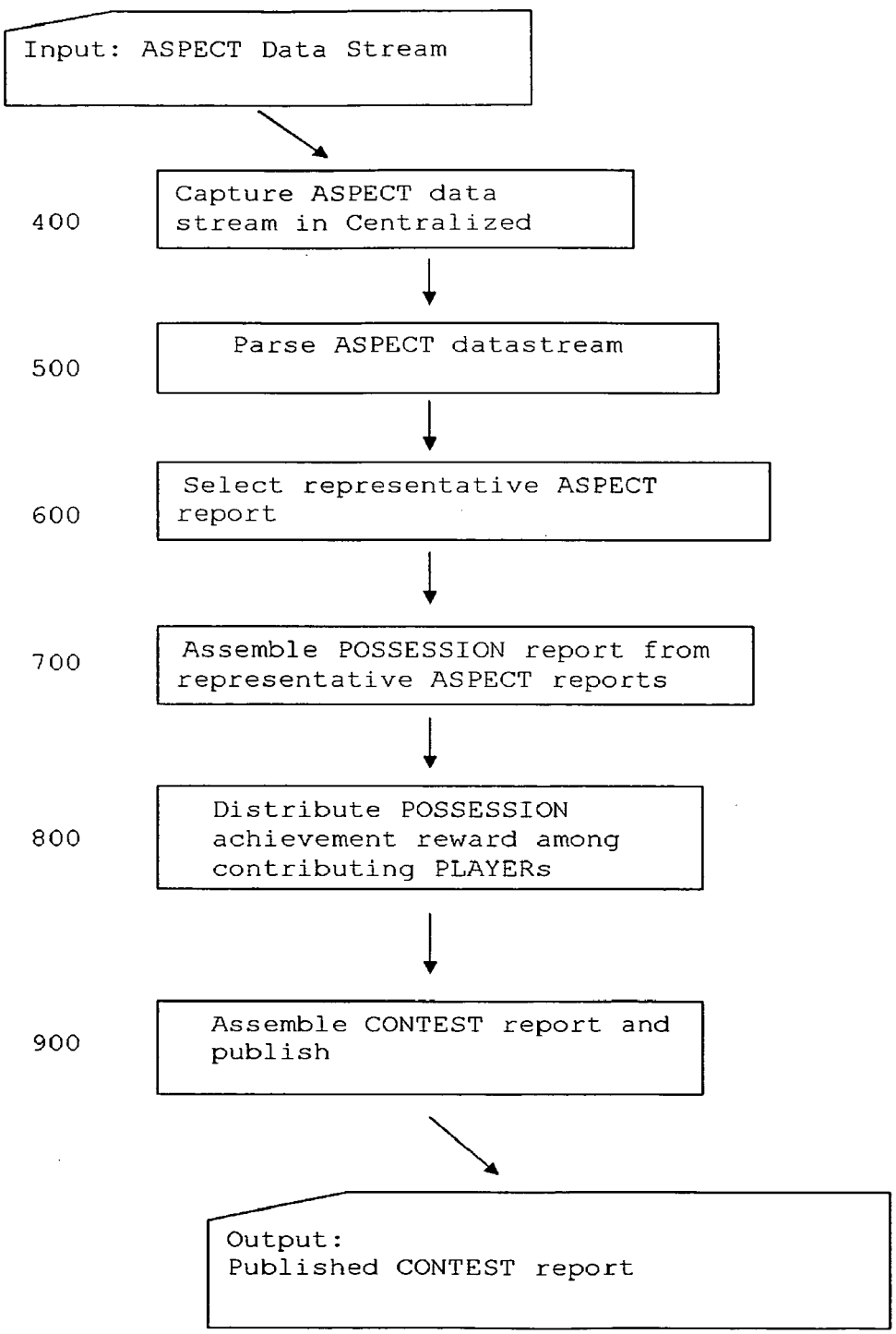

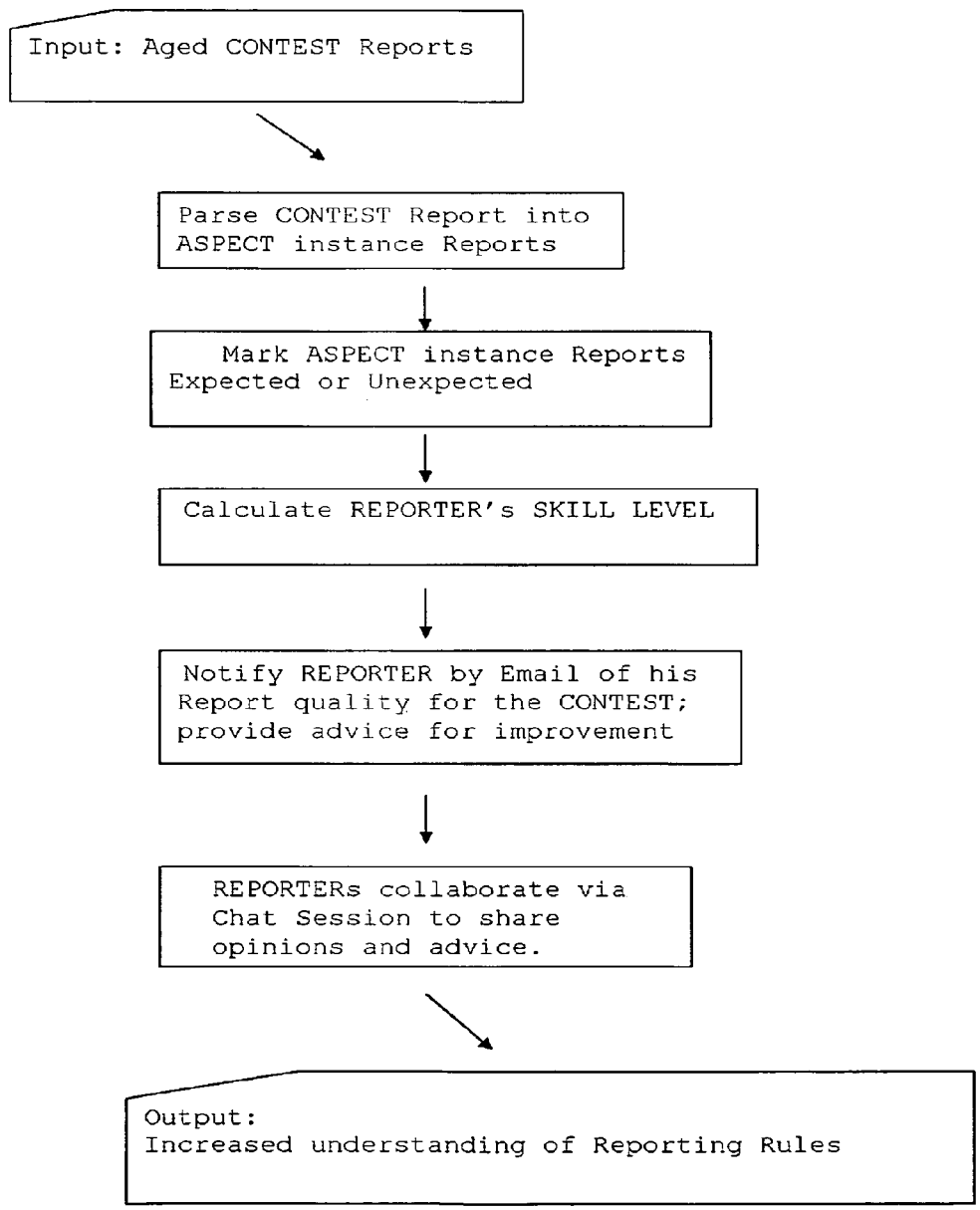
FIG. 11 Quality Feedback Process Sequence

FIG. 12  PLAYER managed Reward System
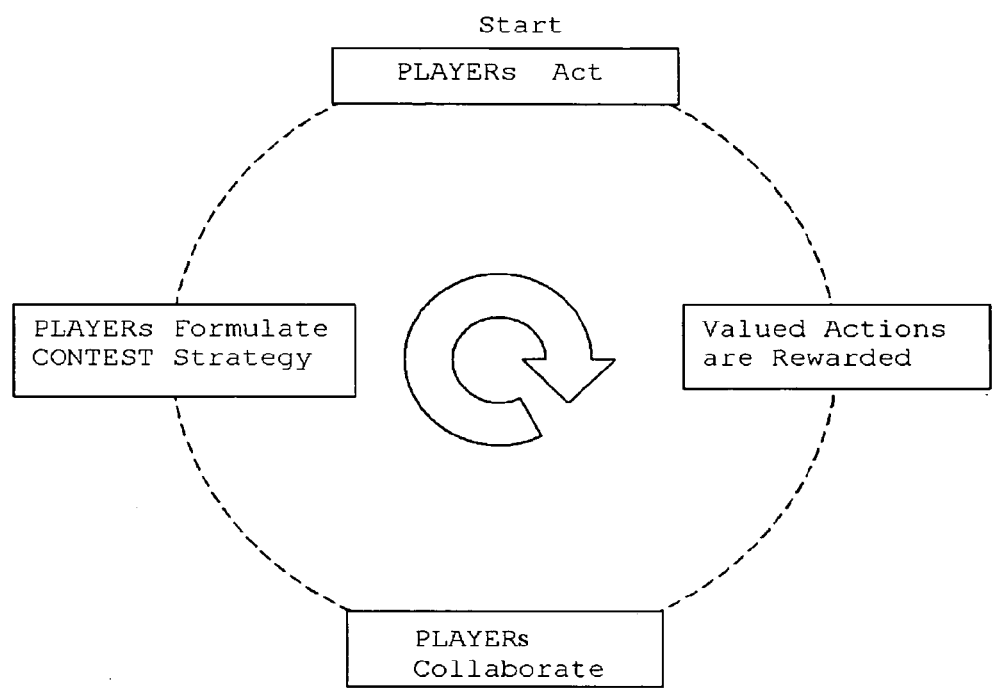

US 7,153,211 B2

METHOD AND SYSTEM TO OPTIMIZE GROUP ACHIEVEMENT EMPLOYING GROUP MEMBERS' COLLECTIVE INTELLIGENCE

BACKGROUND FIELD OF INVENTION

This invention provides people who are interested observers of team competitions with a means for gathering and transmitting data to a central processor where it is processed to produce an analysis of team-member contributions to team achievement.

BACKGROUND DISCUSSION OF PRIOR ART

As we enter the twenty-first century increasingly more of the problems that must be solved by humans are complex in nature. Their solutions require the cooperative effort of group members with different but complementary skills and experience who must interact quickly and efficiently to craft a solution. Groups of humans when functioning as intended are commonly characterized as teams. The literature defines a team as follows: "A team is a small number of people with complementary skills who are committed to a common purpose, performance goals, and approach for which they hold themselves mutually accountable."[3]

[3] The Wisdom of Teams; creating the high-performance organization; Jon R. Katzenbach, Douglas K. Smith; Harvard Business School Press, 1993 Boston Mass.

Although reliance by humans on group effort predates recorded history, high performance team effort is a rare occurrence. This is because as the literature states, "Individuality and self-preservation remain the rule, shared responsibility based on trusting others is the exception. A reluctance to take a risk and submit one's fate to the performance of a team, therefore, is almost inbred"[4]. In many cases plural teams compete for the same resources and goals in a competitive environment. To be successful in a competitive environment, a team must strive to operate at maximum efficiency. This requires that all members' actions add to team synergy.

[4] The Wisdom of Teams; creating the high-performance organization; Jon R. Katzenbach, Douglas K. Smith; Harvard Business School Press, 1993 Boston Mass.

Given the natural reluctance to team orientation, only a supportive value/reward system can encourage team-oriented action. An old business adage comes into play, "you get what you inspect not what you expect". By this axiom a team member will be motivated to maximize his or her performance as measured, because the value/reward system is based on what is measured.

An effective team value/reward system consists of three parts; a) a protocol for observing team activity, b) a method and system for measuring team-member performance, and c) a method and system for reporting team-member actions contributing to team achievement. An example of a compatible protocol and measuring system is the subject of U.S. patent application Ser. No. 09/571,874, filing date May 13, 2000, now U.S. Pat. No. 6,496,812. The scope of the present invention is c) a method and system for reporting team-member actions contributing to team achievement. It gathers and transmits data to a central processor where it is processed to produce an analysis of team-member contributions to team achievement.

The complex nature and the accelerated or protracted pace of activity of many team competitions make it difficult for a single reporter to identify the critical few team-member actions and collaborations that are causal to winning the contest. For this reason it is difficult for the reporter to gain more than a superficial understanding of the causality for team achievement while observing the contest.

The deficiencies of existing methods for investigating and reporting the causes for winning team contests are as follows:

a) Provide no means to report the discovery of team-member actions and collaborations that are causal to team achievement, b) Provide no means for teaching a methodology for observing and reporting team-member collaborations that are causal to team achievement, c) Provide no means for team-members to report their own contributions to team achievement, d) Provide no means to report discovery of successful team-member actions and collaborations to contest participants during the remainder of an on-going contest, e) Provide no means for reporters to collaborate while observing the contest.

SUMMARY

This invention is a method and system for real-time reporting of team-member contributions to team achievement in a contest. The method segments the contest into plural aspects for reporting purposes. Each reporter reports one or more aspects of the contest. Plural reporters can report the same aspect of a contest. When there is redundancy of ASPECT report instances, a single report is selected to represent the plural reports for that particular aspect instance. The representative reports for all aspects are assembled to create a contest report.

The invention uses a game metaphor to provide enhanced entertainment to the reporter. However, this method and system is not limited to entertainment purposes. It can also be used where other motivations are present for the reporter. Reporters view a team contest and, using a pre-determined team-member performance measurement methodology, measure the contribution to team achievement made by one or more team-members during that contest. These measurements are scored and reward values are assigned to the contest participants for their contribution to team achievement. Comparing the individual measurements to a standard, determines their compliance with reporting rules. A feedback mechanism, shown in FIG. 1, notifies reporters of their measurement errors as an aid to improving their future accuracy. Reporters' validated measurements are filtered, scored, aggregated into contest reports and made available to all participating reporters. Optionally, the results are presented to the contest participants to guide the formulation of future competitive strategy as shown in FIG. 2. Measurement accuracy and scope of completeness is evaluated to determine the reporter's skill level. As his expertise in implementing the value system expands, the reporter progresses through a series of game skill levels. Reporters who discover refinements to the value/reward system can recommend their adoption into the team-member performance measurement method being employed.

The present invention achieves the following desired features:

a) means to report team-member actions and collaborations that are causal to a team win; incorporating a means for observing a contest in a manner that reveals the critical few team-member actions; and incorporating a means to value team-member actions for their contribution to a team win, b) means for teaching a methodology for observing and reporting judgments of team-member actions and collaborations. Reported measurements are compared to standard values and accuracy exceptions are fed back to the reporter with instructions for proper measurement, c) means for team-members participating in the contest being reported, to perform the reporting task, d) means to report discovery of successful team-member actions and collaborations to contest participants during the remainder of an on-going contest, e) means for reporters to collaborate while reporting a contest. Reporters communicate through a standard Internet chat facility, sharing questions and opinions to enhance their reporting skills.

These improvements are accomplished by the present invention, which provides the following abstract objects, which are shown in FIG. 3:

1. Process flow abstraction called COMPETITIVE ENVIRONMENT that represents a domain with a set of rules and conditions that determines which team-member actions are contested and which are uncontested. It also determines the relative values of functionally different team-member actions, thereby influencing the activity which team-members employ while contesting to achieve a team goal.

2. process flow abstraction called CONTEST that represents a discrete event where two or more teams strive to exclusively achieve a common goal within a predetermined amount of time.

3. Process flow abstraction called POSSESSION that represents a unique pursuit of a team goal within a CONTEST, beginning with the successful acquisition of the resources required to achieve that goal, and proceeding with the enhancement of those resources by stages until the team goal is achieved, the resources are lost, or the CONTEST duration is exceeded.

4. Process flow abstraction called ASPECT that represents a category of valued team-member actions that contribute to team achievement during a CONTEST. A team-member action within an ASPECT is called an ASPECT instance.

5. Process flow abstraction called PLAYER that represents a team member who participates in a CONTEST by performing actions and interacting with other team members in pursuit of a team goal.

6. Process flow abstraction called REPORTER that represents an interested CONTEST observer engaged in identifying, gathering and submitting data measurements concerning team-member actions and collaborations that contribute to team achievement.

7. Process flow abstraction called ERROR CORRECTION CODE that represents a calculated quantity derived from an ASPECT instance measurement submitted to the reporting process by a REPORTER; and used to determine conformance of that REPORTER's measurements, to a standard measurement value for an ASPECT instance.

8. Process flow abstraction called SKILL LEVEL that represents the level of competence attained by a REPORTER. To attain a specific SKILL LEVEL, the REPORTER must achieve a prescribed standard of performance as determined by the ERROR CORRECTION CODE values of his submitted ASPECT measurements as well as completeness and timeliness of his reports.

In addition, the present invention provides the following mechanisms also shown in FIG. 4:

1. The Registration Mechanism 100 is comprised of a method and collection of co-operating software programs executing on one computer or plural computers on a network, that enables prospective REPORTERs to become authorized to use this system.

2. The Login Mechanism 200 is comprised of a method and collection of co-operating software programs executing on one computer or plural computers on a network, that checks a REPORTER's authorization to use this system when he submits his userID and password.

3. The Sign-up Mechanism 300 is comprised of a method and collection of co-operating software programs executing on one computer or plural computers on a network, that enables a REPORTER to choose a CONTEST and ASPECT to report.

4. Capture Mechanism 400 is comprised of a method and collection of co-operating software programs executing on one computer or plural computers on a network, that receives compacted data reports submitted by REPORTERs and makes them persistent in a centralized database.

5. Parser Mechanism 500 is comprised of a method and collection of co-operating software programs executing on one computer or plural computers on a network, that parses each of these data report strings into ASPECT data elements, inserts the data elements into fields in a report object and stores the report object in the database.

6. Filter Mechanism 600 is comprised of a method and collection of co-operating software programs executing on one computer or plural computers on a network, that selects an ASPECT instance report that is representative of all submissions for a given ASPECT instance. This filtering process eliminates the need to score all but one of the reports for each ASPECT instance within a CONTEST.

7. Assembly Mechanism 700 is comprised of a method and collection of co-operating software programs executing on one computer or plural computers on a network, that aggregates representative ASPECT reports to form POSSESSION reports.

8. Scoring Mechanism 800 is comprised of a method and collection of co-operating software programs executing on one computer or plural computers on a network, that scores all POSSESSION reports by distributing the value assigned to the team achievement, among the PLAYERs reported as contributors to the successful POSSESSION.

9. Publishing Mechanism 900 is comprised of a method and collection of co-operating software programs executing on one computer or plural computers on a network, that aggregates results showing team-members' contributions to team achievement for a CONTEST and publishes the results.

10. QC Mechanism 1000 is comprised of a method and collection of co-operating software programs executing on one computer or plural computers on a network, that compares all ASPECT instance reports to their representative report to see if data element values are identical to those of the representative ASPECT report. This mechanism classifies reports with identical values as "expected" and non-identical values as "unexpected". The identical and non-identical totals are compiled for each REPORTER that has signed-up to score a CONTEST. A high occurrence of "expected" status indicates a high degree of reporting conformance of his ASPECT reports to those from most other REPORTERs.

11. Email Mechanism 1100 is comprised of a method and collection of co-operating software programs executing on one computer or plural computers on a network, that formulates and sends an email message to each REPORTER who has submitted reports. The email message is used to teach the REPORTER by pointing out his errors and directing him to study the ASPECT Reporting Rules that he has miss-applied.

12. Chat Mechanism 1200 is comprised of a method and collection of co-operating software programs executing on one computer or plural computers on a network, that enables the community of REPORTERs to interact and share questions and opinions while observing the CONTEST. When a REPORTER signs up to report a CONTEST, the Sign-up Mechanism passes his reporterID to the Chat Mechanism and the REPORTER becomes authorized to enter the Chat Room for that CONTEST. This enables the REPORTER to collaborate with other REPORTERs covering that CONTEST Those and other improvements are set forth in the following detailed description. For a better understanding of the present invention with advantages and features, refer to the description and to the drawings.

DETAILED DESCRIPTION OF THE INVENTION

Basic Structure of a Preferred Embodiment of the Invention

The preferred embodiment of the present invention utilizes a pre-determined model for achieving a group goal that provides a common protocol for observing a CONTEST and a common value system to identify valued team-member actions. An exemplary model is defined in U.S. patent application Ser. No. 09/571,874, filing date May 13, 2000, now U.S. Pat. No. 6,496,812. However, other models for achieving a group goal could be employed.

Figure 5:
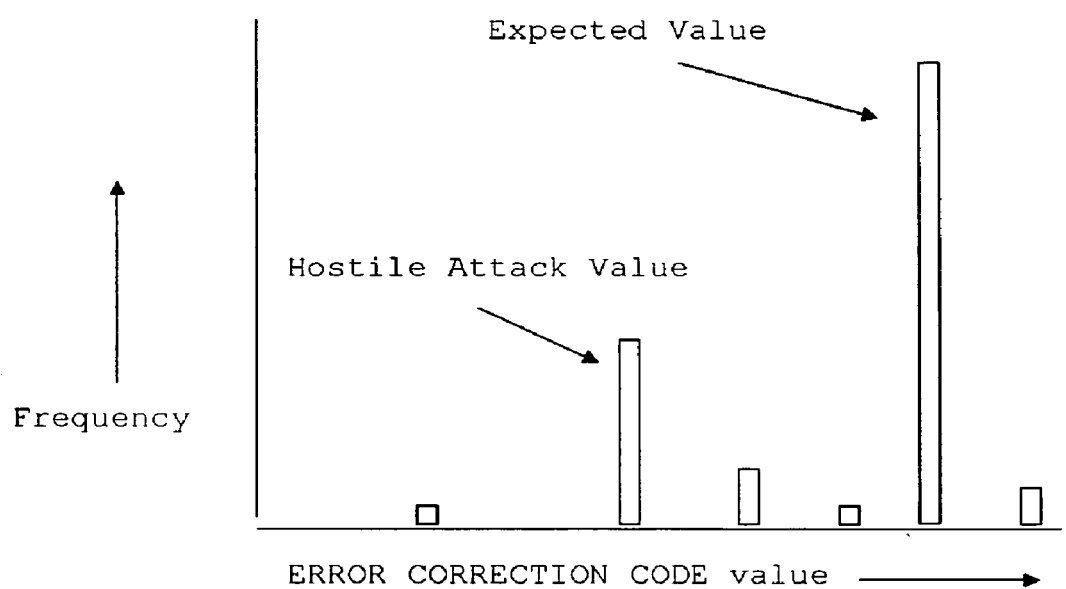

The present invention segments the CONTEST into discrete ASPECTs in order to reduce the complexity of the reporting task. The invention also permits redundancy of reports for each ASPECT instance. This has three beneficial effects, 1) redundancy tends to create a statistical frequency distribution for ASPECT report measurement values, with the highest frequency of occurrence being chosen as the "expected" value as shown in FIG. 5, 2) redundancy enables the selection of a representative report from the set of redundant ASPECT reports, thus reducing the threat to data integrity resulting from false reports submitted by a hostile reporter as shown in FIG. 5, 3) redundancy eliminates the need to score all but one report for each ASPECT instance.

The present invention also incorporates a multi-user game metaphor to enhance its entertainment value. This game metaphor incorporates the re-occurring themes of teamwork and self-improvement. The theme of teamwork emerges as a) the team-work of PLAYERs is measured, and in the process REPORTERs learn how to identify and value teamwork, b) PLAYERs use the reported results to improve their teamwork, c) REPORTERs cooperate to achieve complete ASPECT coverage of a CONTEST, d) REPORTERs collaborate with each other to learn effective reporting techniques and to participate in refining the ASPECT Reporting Rules. As the REPORTER's expertise in implementing the value system improves, he advances through a series of game SKILL LEVELs. SKILL LEVELs are attained by achieving a high level of measurement accuracy. Since accuracy is a subjective interpretation of the reporting rules, the assumption is made that plural informed REPORTERs will tend to make similar subjective judgments. Another assumption is that REPORTERs will become more informed and skilled with practice. Therefore report accuracy is defined as conformance to the norm. The subset of Normal reports for an ASPECT instance have the most frequently occurring ERROR CORRECTION CODE value in the set of ASPECT instance reports under consideration (see FIG. 5). A chat facility is provided for REPORTERs to collaborate in their interpretation and refinement of the reporting rules that REPORTERs must follow. The system administrator can incorporate these improvements into the reporting rules. This collaborative process could enable the team of REPORTERs to evolve and refine the value/reward system being employed.

Figure 6:
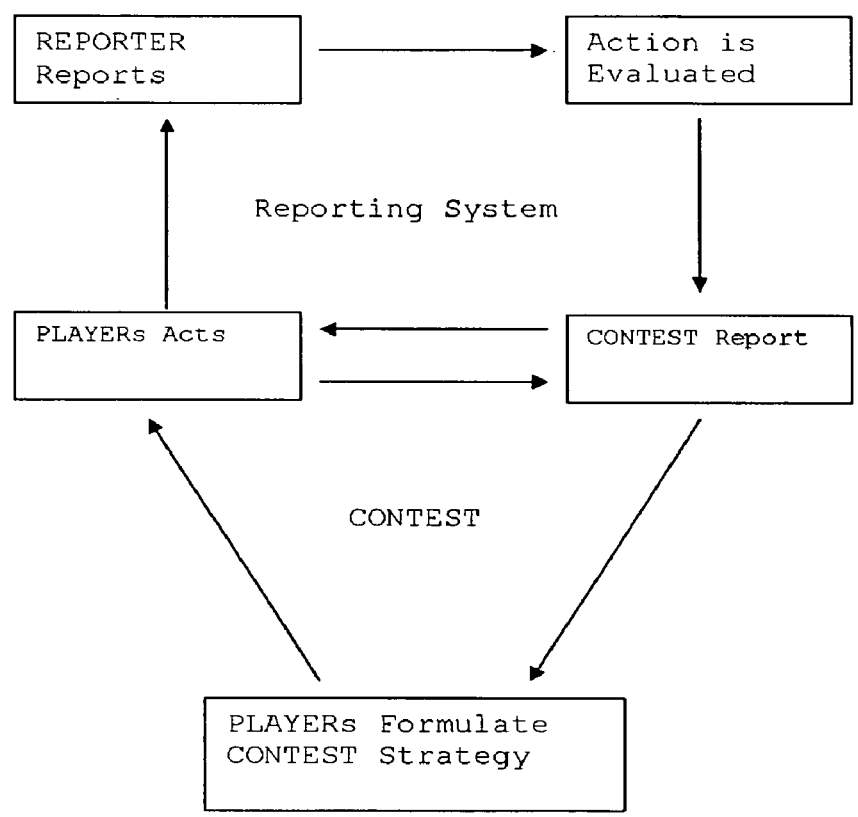

The present invention also has the capability of indirectly integrating the REPORTER into the CONTEST being reported. This occurs in cases where reported results are processed by the system and fed in real-time to the CONTEST PLAYERs who formulate their CONTEST strategy using this feedback. In this case, the invention extends the CONTEST boundary to include the REPORTER as an indirect CONTEST participant as shown in FIG. 6.

Figure 7:
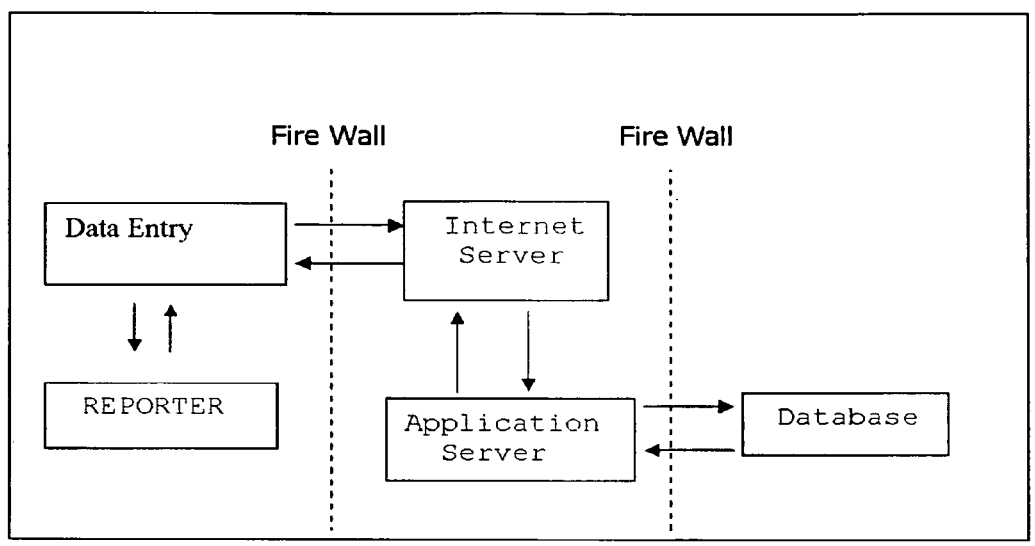

This embodiment of the invention consists of a collection of co-operating computer programs executing on one computer or plural computers connected by a network, as shown in FIG. 7. This particular implementation of the invention utilizes an IBM HTTP Server, SendMail Mail Server, IBM Websphere Web Application Server and IBM DB2 database on plural computers connected to the Internet. The computer programs that implement workflow are implemented as Java objects in the form of Java Servlets, Java Beans, Enterprise Java Beans and Java Server Pages. The Java program interface to the Mail Server is the Java Mail API. Standard Internet, television and wireless communication protocols are employed to implement data transmission. However, any general-purpose message passing mechanism, programming language and computer platform is sufficient to implement the features of the present invention. The output of the Data Entry Device is telecommunicated over the Internet through a Firewall to an Internet server.

Figure 8:
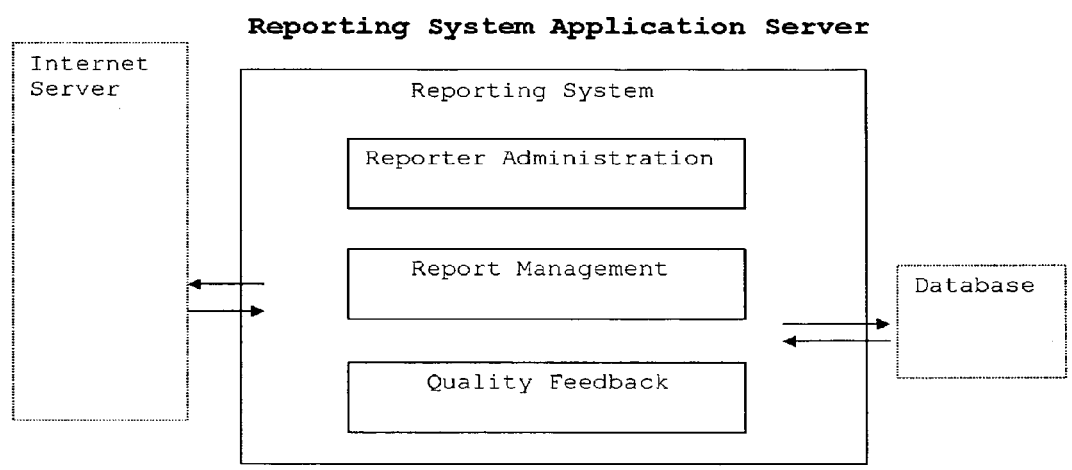

The Reporting System shown in FIG. 8, is comprised of Java Servlets, Java Beans, Java Server Pages and Enterprise Java Beans residing on the Internet Application Server. Objects are made persistent using Container Managed Persistent Enterprise Java Beans on the Internet Application Server connected through a firewall to a Database Server. The system verifies that the submission came from an authorized REPORTER and then processes the report along with reports from other REPORTERs to create a composite report for the entire CONTEST and publishes this CONTEST report as a Java Server Page or an XML file. The system also collects data on the quality of reporting and provides feedback to each REPORTER regarding the quality of his reporting. The system merges personalized report quality information into an explanatory text template and creates and sends the resulting text message as an email message via the Internet Mail Server using the Java Mail API.

This embodiment of the invention is implemented in a fashion that reduces system administration. Internal system functions such as report processing and reporter feedback are automated, while REPORTER input such as report submission, REPORTER registration, Login, Chat session and CONTEST sign-up are event driven processes initiated by a REPORTER.

Figure 1:
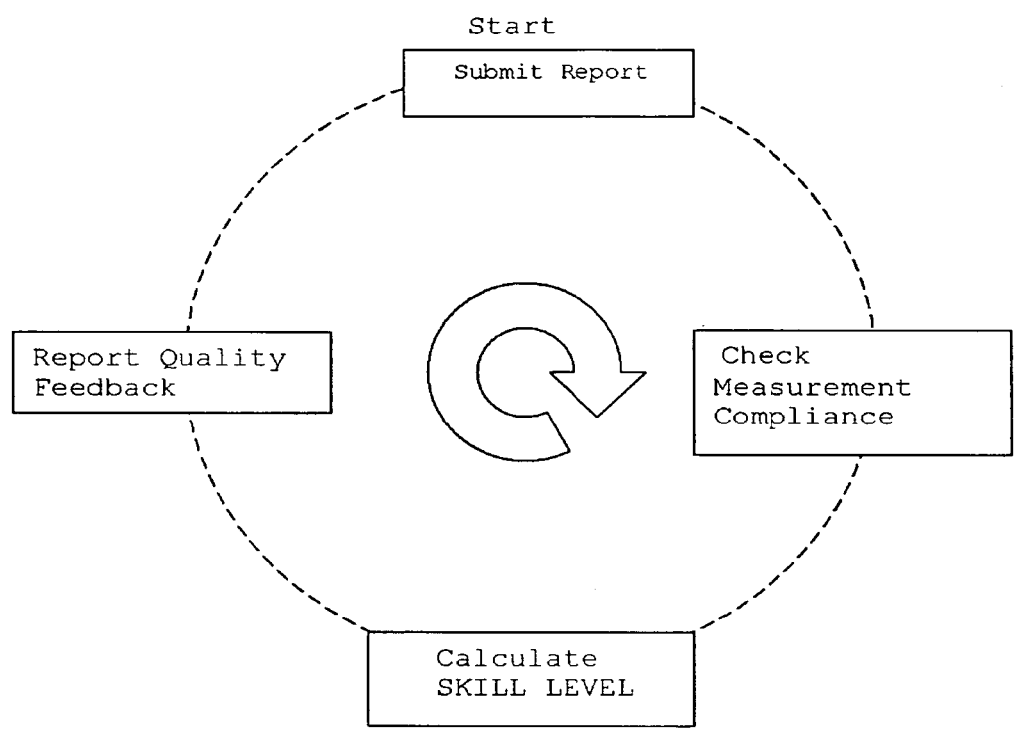
FIG. 1—shows Reporter Learning Process
FIG. 2—shows Player Learning Process
FIG. 3—Containment Diagram showing Abstract objects
FIG. 4—shows Reporting System Components
FIG. 5—shows the Representative ASPECT Report
FIG. 6—shows Reporting System/PLAYER Interaction
FIG. 7—shows Reporting System Configuration
FIG. 8—shows Reporting System Application Server
FIG. 9—shows Reporter Administration Process Sequence
FIG. 10—shows Report Management Process Sequence
FIG. 11—shows Quality Feedback Process Sequence
FIG. 12—shows Team-member managed Reward System
Figure 2:
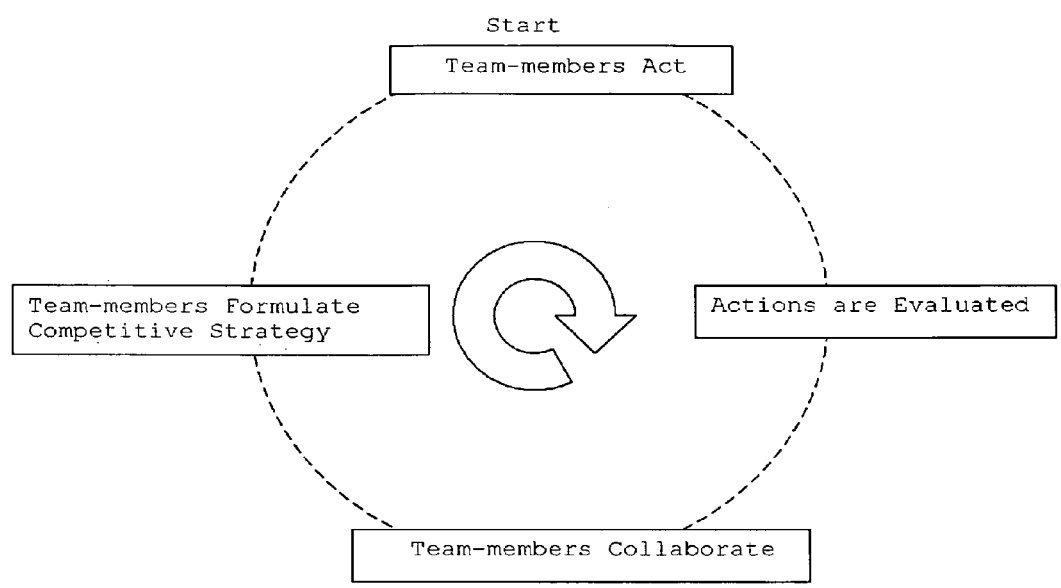
Figure 3:
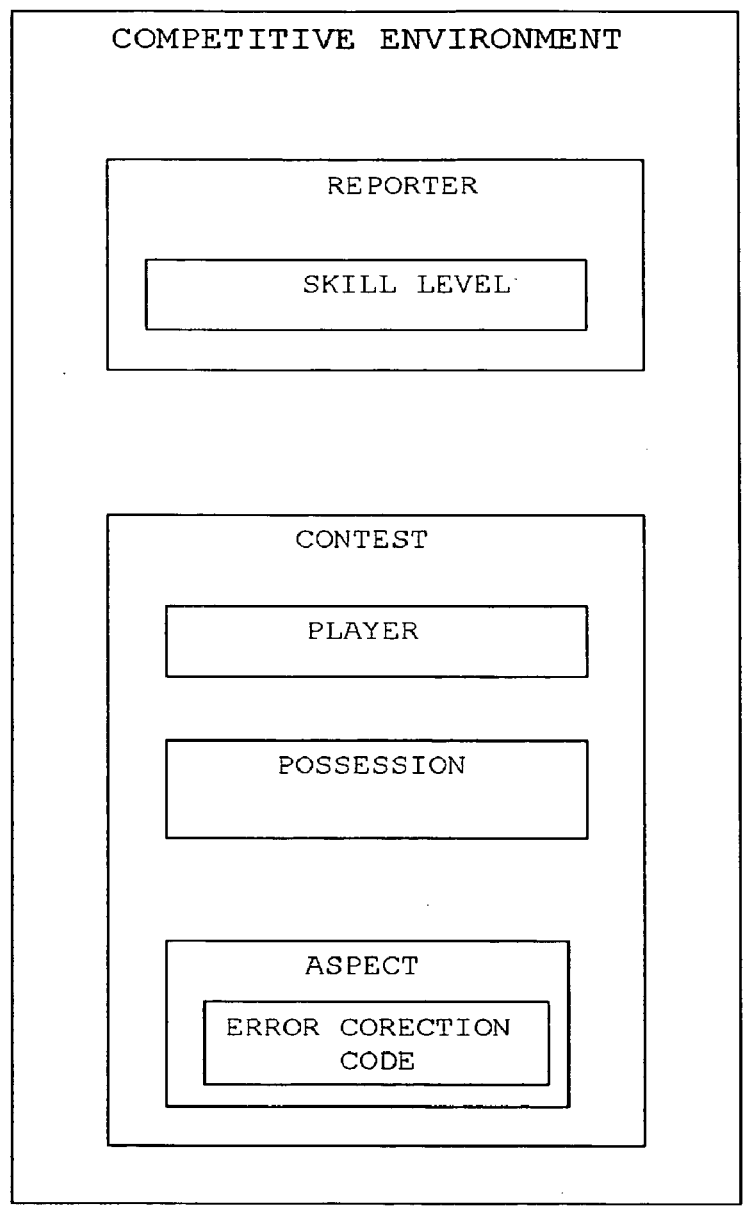
Figure 4:
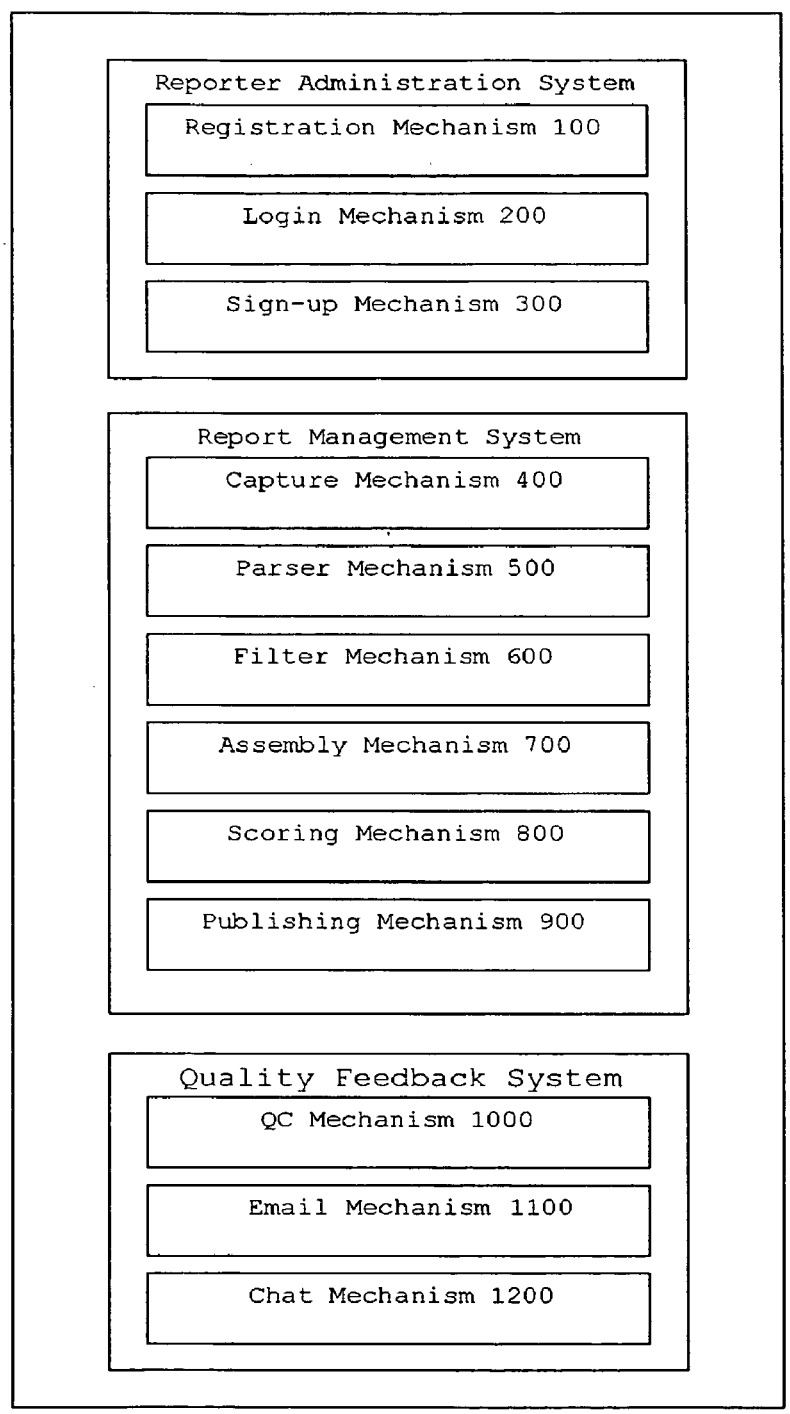

For the purposes of teaching this invention, the following description of a preferred embodiment uses the general concepts of messages and entities, instead of object-oriented terminology. The Reporting System of this embodiment as shown in FIG. 4, consists of three sub-systems: a) Reporter Administration, b) Report Management, and c) Quality Feedback. The following mechanisms comprise these systems.

Reporter Administration System

Registration Mechanism 100

The Registration Mechanism enables prospective REPORTERs to become authorized to use this system. It registers each distinct REPORTER and assigns a unique reporterID to him. It can provide a reporterID for an existing REPORTER when given a userID and password.

Login Mechanism 200

Checks a REPORTER's authorization to use this system when he submits his userID and password. Interacts with the Registration Mechanism to ascertain a REPORTER's SKILL LEVEL and uses it to determine and present an appropriate set of game options for the REPORTER.

Sign-Up Mechanism 300

Enables a REPORTER to choose a CONTEST and ASPECT to report. The REPORTER is presented with a matrix containing ASPECTS and levels of committed REPORTER Coverage for the CONTEST he is signing up to report. This information enables plural REPORTERs to cooperate in providing evenly distributed coverage of ASPECTs within CONTESTs. Upon selecting a CONTEST and ASPECT, this mechanism presents the REPORTER with a form to record the ASPECT instance data for his chosen ASPECT.

Report Management System

Capture Mechanism 400

Receives compacted data reports submitted by REPORTERs, adds a system time stamp and makes the record persistent in a centralized database. It then notifies the REPORTERs data entry device that his report has been received. This process is given the highest priority in order to free the REPORTER's data input device for further use. This mechanism includes a Java Servlet operating on a high priority thread. The ASPECT measurement data is concatenated into a stream by the browser for transmission to this Capture Mechanism. The efficiency of data transmission is aided by limiting the size of the data stream. The individual data parameters of the report can be identified by their character position in the stream. In addition to the measurement data elements, each report contains data elements to identify REPORTER, SKILL LEVEL, CONTEST, Team, ASPECT, POSSESSION and Error Correction Code.

Parser Mechanism 500

Processes the report data using a Java Servlet operating on a lower priority thread when system resources become available. This mechanism parses each ASPECT report data stream into data elements and populates a report object. It then makes the parsed report persistent in the centralized database. The Parser Mechanism maintains a reference to the last data stream that was parsed. This serves as a marker to identify new reports that must be parsed. This mechanism operates by periodically parsing data streams in queue, then sleeping in a timed sequence.

Filter Mechanism 600

A filtering process is employed to filter redundant reports. The Filter Mechanism retrieves the set of all parsed reports for a given ASPECT instance of a POSSESSION within a CONTEST. It applies an algorithm to each member of the set to determine if an aging requirement has been met. If the aging requirement has not been met, that member, and all other members of the set, are marked "hold" and no processing takes place on members of the set. The Filter Mechanism applies the age testing process to another set of parsed reports in the database that has not been marked "hold". If the aging requirement has been met, the Filter Mechanism selects a representative report from the set. One selection method is to calculate the most frequent ERROR CORRECTION CODE value from each set of parsed reports. The ERROR CORRECTION CODE identifies all reports relating to a specific POSSESSION that contain identical measurement values. The ERROR CORRECTION CODE is the sum of all data measurements in the data measurement string. Reports are grouped by frequency of ERROR CORRECTION CODE value for each ASPECT instance within a CONTEST. The frequency of occurrence of the ERROR CORRECTION CODE value for all reports relating to each ASPECT instance is determined. A report with the highest frequency ERROR CORRECTION CODE value is selected as the representative report. For a hostile attack false value to be chosen, it must have the highest frequency of occurrence and an associated high visibility for detection. The chosen report is subjected to the scoring algorithm of the value system and used as the valid measurement for that ASPECT instance. The Filter Mechanism then stores this report in the centralized database and marks all other reports in the set as "filtered".

Assembly Mechanism 700

Aggregates representative ASPECT reports into POSSESSION reports for the CONTEST. This is accomplished by loading the ASPECT measurement elements from the representative reports into the associated POSSESSION objects and making them persistent in the centralized database.

Scoring Mechanism 800

Scores all POSSESSION reports by distributing the reward value assigned to the team achievement resulting from that POSSESSION according to the scoring algorithm of the value system of the COMPETITIVE ENVIRONMENT. The reward value attributed to the successful POSSESSION is divided among PLAYERs that were reported as contributors to the success of the POSSESSION.

Publishing Mechanism 900

Aggregates POSSSESSION results into CONTEST results showing PLAYERs' contributions to team achievement for the CONTEST. These results are formatted and published for optional distribution via website, interactive TV, wireless device, electronic scoreboard, newspapers or other media of mass distribution.

Quality Feedback System

QC Mechanism 1000

Compares all ASPECT data reports to their representative report to see if ERROR CORRECTION CODE values are identical to those of the representative report. If they are, the reports are given "expected" status; if not identical they are classified with "unexpected" status. The results are compiled for each REPORTER as a measure of his reporting compliance. If the "expected" total is equal to, or greater than the threshold for the REPORTER SKILL LEVEL of that ASPECT, the REPORTER is classified as "Skilled" in that ASPECT. This classification is passed to the Registration Mechanism where it is recorded in the REPORTER's record.

Email Mechanism 1100

Formulates an email message consisting of a template of explanatory text merged with personalized data obtained from the QC Mechanism that shows the recipient's "expected" and "unexpected" totals and SKILL LEVEL. This email message is sent to each REPORTER who has submitted reports. The goal is a high occurrence of "expected" status indicating that his results where similar to those from most other REPORTERs.

Chat Mechanism 1200

Utilizes standard Internet Chat technology to enable the community of REPORTERs to interact and share experiences and ideas without being physically co-located. When a REPORTER signs up to report a CONTEST, the Sign-up Mechanism passes his reporterID to the Chat Mechanism and the reporter becomes authorized to enter the Chat Room for that CONTEST. This enables the REPORTER to collaborate with other REPORTERs covering that CONTEST. It also enables messages to be sent to this group of REPORTERs by the system administrator.

System Operation

The Reporter Administration Process sequence is shown in FIG. 9.

Step 1:

A REPORTER registers himself with the Registration Mechanism 100. This is accomplished by using a fixed wire or wireless interactive Internet access device such as Personal computer, interactive TV set-top box, personal digital assistant, wireless phone, or other similar device to make selections and transmit data to the system data processing computer. The REPORTER chooses a user name and password and is assigned a unique reporterID and a game SKILL LEVEL=0. The inputs to Step 1 are username and password. The outputs of Step 1 are reporterID and SKILL LEVEL.

Step 2:

A REPORTER logs into the Login Mechanism 200 by submitting his user name and password. The Login Mechanism passes this information to the Registration Mechanism 100 and the REPORTER's reporterID is returned along with his SKILL LEVEL. The Login Mechanism uses this information to present the REPORTER with game options consistent with his SKILL LEVEL. The inputs to Step 2 are reporter user name and password. The output of Step 2 is a Java Server Page listing authorized reporting options for the REPORTER.

Step 3:

The REPORTER chooses a particular CONTEST from a list, and then chooses an ASPECT to report. A matrix showing the number of REPORTERs who have already made commitments to report on specific ASPECTs of his chosen CONTEST guides his choice. REPORTERs are motivated to choose the ASPECT with the lowest committed coverage in order to insure complete coverage of the CONTEST. By adding ASPECT instance reports to the pool of CONTEST information submitted by all REPORTERs, a REPORTER qualifies to receive analyses derived from the pool of information submitted by all REPORTERs. This gives the REPORTER expanded insight to causality for the team achievement that he would not have gained as a single observer. Inputs to Step 3 are CONTEST, ASPECT and Team. Output for Step 3 is a Java Server Page data entry form for reporting the ASPECT specified in the input.

Step 4:

The REPORTER is presented with a data-entry form consistent with his SKILL LEVEL, and the CONTEST and ASPECT he selected during game sign-up. This form provides access to the specific ASPECT Measurement Rules that the REPORTER must follow in judging PLAYER actions. The form also provides access to the cumulative CONTEST information processed up to that point. The REPORTER submits the form with his ASPECT report measurements. This step is repeated for each ASPECT instance until the CONTEST ends. The input for Step 4 is ASPECT instance data. The output is an ASPECT instance report submission.

Step 5:

One representative ASPECT measurement is selected to represent each ASPECT instance of the CONTEST for a team. Only those representative ASPECT measurements are processed through the scoring algorithm. An ERROR CORRECTION CODE is used as a measure to compare values of ASPECT measurements in the selection of the representative ASPECT report. One method for computing the representative ASPECT measurement is to group all ASPECT measurements by ERROR CORRECTION CODE value, for each ASPECT instance of a CONTEST. Then select an ASPECT report with the most frequently occurring ERROR CORRECTION CODE value as the representative measurement of this set. The Report Management Process has 5 steps as shown in FIG. 10:

a) On a periodic basis, the Parser Mechanism 500 will check for the arrival of new ASPECT reports submitted by REPORTERs. It parses each of these report data strings into ASPECT data elements, inserts the data elements into fields in a report object and stores the report object in the database. This process is repeated until all reports in the arrival queue have been parsed. This process is repeated on a periodic basis.

b) A filtering process is employed to reduce data processing and protect data integrity. On a periodic basis, the Filtering Mechanism 600 will select a representative report for each ASPECT instance for a team in an ongoing CONTEST.

c) The Assembly Mechanism 700 consolidates data from these representative reports to populate the POSSESSION report entity with ASPECT measurements and then stores the POSSESSION report in the database.

d) The Scoring Mechanism 800 scores all POSSESSION reports by distributing the reward value assigned to the team achievement for that POSSESSION according to the scoring algorithm of the value system for the COMPETITIVE ENVIRONMENT. The reward value attributed to the successful POSSESSION is divided among PLAYERs that were reported as contributors to the success of the POSSESSION.

e) The Publishing Mechanism 900 aggregates POSSESSION reports to create CONTEST reports showing PLAYERs' contributions to team achievement for the entire CONTEST. These results are formatted and published via website, interactive TV, wireless device, electronic scoreboard, newspapers or other media of mass distribution. The inputs to Step 5 are ASPECT instance reports. The output from Step 5 is a CONTEST report.

Step 6:

The Quality Feedback Process has 6 steps as shown below and in FIG. 11:
  a) On a periodic basis, with a lower processing priority, the QC Mechanism will check for CONTEST reports that exceed an aging requirement. CONTEST reports that do exceed this age threshold are processed.
  b) CONTEST reports are parsed into their representative ASPECT instance reports.
  c) Each representative ASPECT instance report is used to retrieve all previously "filtered" reports for that ASPECT instance.
  d) Each of these "previously filtered ASPECT instance reports is compared with its representative ASPECT report using the ERROR CORRECTION CODE value to determine if data element values are identical to those of the representative report. If they are, the report is classified with "expected" status. If data element values are not identical, the ASPECT instance report is given "unexpected" status. The status results are a measure of reporting accuracy for each REPORTER that has signed-up to score the CONTEST,
  e) The sum of "expected" status ASPECT instance reports is compared to the REPORTER SKILL LEVEL threshold for that ASPECT; if the "expected" total is equal to or greater than the REPORTER SKILL LEVEL threshold for that ASPECT, the REPORTER is classified as "Skilled" in that ASPECT of reporting.
  f) The QC mechanism tells the Registration Mechanism to declare the REPORTER "skilled" in that ASPECT of reporting.

The inputs to Step 6 are ASPECT instance reports and CONTEST reports. The outputs from Step 6 are Total Expected, Total Unexpected, CONTEST, ASPECT and reporterID, SKILL LEVEL.

Step 7: The Email Mechanism formulates an email message consisting of a template of explanatory text merged with personalized status results obtained from the QC Mechanism that shows the recipient's "expected" and "unexpected" report totals and his SKILL LEVEL. This email message is sent to each REPORTER who has submitted reports. The goal is a high occurrence of reports with "expected" status, indicating that the REPORTER's measurements are similar to those of most other REPORTERs. The REPORTERS' status results are compared with the SKILL LEVEL threshold and his SKILL LEVEL is re-evaluated. REPORTERs receiving an excessive number of "unexpected" results are instructed to study the ASPECT Measurement Rules to increase the quality of their future judgments and achieve or maintain SKILL LEVEL compliance. The Email Mechanism is also used to mass-communicate messages of general interest to REPORTERs. The inputs to Step 7 are CONTEST, Expected Results, Unexpected Results, reporterID and SKILL LEVEL. The output of Step 7 is a personalized email message sent to each participating REPORTER showing his Expected Results, Unexpected Results and SKILL LEVEL.

Step 8: When a REPORTER signed-up to report a CONTEST in Step 3, the Sign-up Mechanism passed his reporterID to the Chat Mechanism and the REPORTER became authorized to enter the Chat Room for that CONTEST. As a result, the REPORTER can converse with other REPORTERs covering that CONTEST during and after the CONTEST. The Chat facility enables the REPORTERs to learn, develop group consensus and formulate recommendations for improvements to the reporting rules for the COMPETITIVE ENVIRONMENT. The system administrator can incorporate these improvements into the reporting rules. This collaborative process enables the team of REPORTERs to evolve and refine the value/reward system being employed. The inputs to Step 8 are reporterID and CONTEST. The output from Step 8 is a Chat Room for the CONTEST specified in the input, with the reporterID authorized for access to the Chat Room.

PREFERRED EMBODIMENT

The present disclosure illustrates the invention as applied to the game and business of Basketball. It is presented for the purpose of illustration and is not intended to limit the invention to the specific embodiment illustrated. The invention is intended to cover all implementations within the scope of the appended claims.

This embodiment is a method and system comprised of a collection of cooperating computer programs on one or plural computers connected in a network. The REPORTER in this preferred embodiment is the dedicated fan of a Basketball team. The complex nature and the accelerated pace of activity during a Basketball game makes it difficult for a single fan, to identify the critical few PLAYER actions and collaborations that are causal to his team winning the game. While observing the game, it is difficult for fans to gain more than a superficial understanding of the causality for a team win. They find it easier to focus on PLAYERs' exceptional physical feats instead of creativity and collaboration among PLAYERs. Consequently, fans often focus on the superficial aspects of play. They are unable to attain their potential role, to provide emotional support to their team by recognizing and cheering excellence in all ASPECTs of team play.

This preferred embodiment of the present invention utilizes a protocol for observing the Basketball game that enables fans to focus on one or more of the critical few PLAYER actions that contribute to their team's achievement. It also utilizes a value system demonstrated to be consistent with winning, for the fan to use in identifying effective PLAYER actions. The protocol and value system being used are described in U.S. patent application Ser. No. 09/571,874, filing date May 13, 2000, now U.S. Pat. No. 6,496,812. This methodology breaks the CONTEST into a set of elemental CONTESTs called POSSESSIONs. A POSSESSION represents a unique pursuit of a team goal, beginning with the successful acquisition of the resources required to achieve that goal (ball), and proceeding with the enhancement of those resources (create shooting opportunity) by stages until the team goal is achieved (shooting to score points), the resources are lost, or the CONTEST duration is exceeded (game-clock time).

This embodiment of the invention uses a game metaphor to enhance the entertainment value to the Basketball fan. The game is designed to have plural fans sharing the reporting effort, each reporting an ASPECT of the Basketball game. By reporting one ASPECT, each fan REPORTER gains access to the pool of data reported by all REPORTERs. REPORTERs compete with their own personal best reporting accuracy to increase or maintain their SKILL LEVEL. However, they cooperate with fellow fan REPORTERs to insure that all ASPECTs of the Basketball game are reported. When fan REPORTERs analyze their conformance to the norm and discuss differences with the other REPORTERs via chat session, they can as a team evolve the reporting rules of the value/reward system being employed. This combination of self-competition and team-member collaboration mirrors the activity they are looking for in their roles as REPORTERs.

Basketball Competitive Environment

Winning a Basketball game requires the cooperation of five players. A Basketball game or CONTEST has a predetermined goal—to score more points than the competing team in the prescribed amount of time. Equal access to resources (the Basketball) is mandated by rules that distribute the ball evenly between teams but also allow teams to contest for possession of the ball. The game tempo and changing team line-ups provide a constantly changing game environment. The Basketball COMPETITIVE ENVIRONMENT provides a setting for pure competition. In the Basketball COMPETITIVE ENVIRONMENT there is a winning and loosing team at the action level, POSSESSION level and the CONTEST level.

In the Basketball Competitive Environment, the ultimate goal—winning the game—requires a team to score more points than the opposing team. A team can only score points if it has possession of the Basketball. Since a game is the sum of its POSSESSIONs, acquiring and maintaining possession of the ball are the fundamental objectives of each POSSESSION. During a POSSESSION the goal of one team is to try to maintain control of the ball and score points while the goal of the competing team is to try to extend the duration of the POSSESSION until it is successful in acquiring control of the ball. Each POSSESSION has a winning team and a losing team based on whether or not points are scored during that POSSESSION. The sum of the results of all POSSESSIONs determines the result of the CONTEST, or game. Basketball rules give uncontested possession of the ball to a team after certain events such as an opponent's Field Goal.

Operation

Fans do not have to be present at the game to report the game activities. Watching on TV is sufficient to hear and see everything necessary to report most relevant ASPECTs of the game. According to the value/reward system being employed in this embodiment, relevant ASPECTs include acquiring control of the Basketball, creating a scoring opportunity, shooting to score points and the game-clock time that PLAYERs enter and leave the game. Actions are only valued if they result in points being scored in a POSSESSION. A fan must identify a potentially valued action and continue to follow the play to see if the action is part of a successful sequence resulting in points scored. If points are scored, the potentially valued action becomes a valued action and the fan submits his ASPECT instance report for this POSSESSION. Fans viewing the game on TV can submit their reports in one or more ways. These ways include via personal computer, interactive TV remote control, wireless phone or Internet access device. Their reports are transmitted to a centralized Internet server and become part of a pool of reports from which representative reports are selected to construct a composite report of all ASPECTs of the game. Fans only have to report on one ASPECT to gain access to the composite information compiled from all fan reports. Fans are allowed to choose the ASPECT they will report. They are encouraged to cooperate by selecting an ASPECT with a relatively low level of fan coverage, thus promoting adequate coverage of all relevant ASPECTS of the game and producing a complete CONTEST report.

By cooperating as a community in this way, fan REPORTERs learn and reap the benefits of teamwork themselves. Each fan REPORTER gains access to the pool of data gathered by all fans and processed by this system. This valuable information can also be used to benefit the game contestants. The game analysis produced from fan reports can be fed to the coaches and PLAYERS to guide competitive strategy as the game continues. A participant in the CONTEST can access the cumulative POSSESSION reports as they are processed and communicate the results to the PLAYERs. As shown in FIG. 6, the fan will play an important part in determining the success of his team. This adds to the fun and entertainment value and increases the motivation for fans to participate. A by-product of this game is the learning experience. Fans are educated in the factors that produce a winning team effort. When they choose an ASPECT to report, they are presented with the ASPECT Measurement Rules for reporting PLAYER actions that have been demonstrated to produce winning results. By learning to recognize these PLAYER actions and collaborations, the fan learns the underlying factors that contribute to a winning team effort. This added insight creates a community of fans who find entertainment in collaborating via the invention's online Internet Chat Mechanism.

The accuracy of the information produced by fan reporters is a key factor in the effectiveness of this embodiment of the present invention. The Quality Feedback System shown in FIG. 11, checks the level of compliance of a fan's reports and sends him an email report card after a game to explain how the ASPECT data in his reports compared to other REPORTERs' submissions covering the same ASPECT of that game. The email message shows the fan REPORTER how many of his POSSESSION reports had "expected" data values and how many had "unexpected" data values. It also contains a link to the ASPECT Measurement Rules, which he can study to help him achieve or maintain compliance on his future reports. As his expertise in implementing the value system expands, the fan REPORTER progresses through a series of game SKILL LEVELs. Fans are recognized as skilled in reporting a specific ASPECT when they achieve a prescribed total of "expected" ASPECT reports in a game. A fan REPORTER that achieves this SKILL LEVEL for a single ASPECT is motivated to gain skill in other ASPECTs until proficiency is attained in all ASPECTs of reporting. An example of ranking levels is Gold for proficiency in four ASPECTS, Silver for proficiency in three ASPECTs and Bronze for two ASPECTs. Special privileges can be awarded based on these rankings.

When a fan signs up to report a game, he can be authorized to enter the Chat Room for that game. This enables the fan REPORTER to converse with other fans reporting that CONTEST. The Chat facility enables fans to learn, share their questions and opinions, develop consensus and formulate group recommendations. Fans who discover refinements to the value/reward system can recommend their adoption into the team-member performance measurement method being employed.

SECOND PREFERRED EMBODIMENT

Another preferred embodiment of this invention is a method and system comprised of a collection of cooperating computer programs executing on one or plural computers connected in a network for reporting actions by Selling-Team members that contribute directly to a Selling-Team sale in a commercial COMPETITIVE ENVIRONMENT. The selling team is comprised of members who perform the same, or compatible but functionally different tasks in the sales process. The sales process typically consists of the following ASPECTs; acquiring contact information about potential customers, creating a solution personalized to the customers' need, handling customer objections, testing to close and install the solution, and receiving payment. Unlike the Basketball COMPETITIVE ENVIRONMENT, in the COMMERCIAL COMPETITIVE ENVIRONMENT, competition is pure only at the Testing, or Close and Install stage. Competing Selling Teams can proceed successfully through the selling process to the Testing, or Close and Install stage. In this scenario a sales opportunity is a POSSESSION. Only POSSESSIONs that result in payment for product or service are considered successful. The sales compensation for a sale is divided among the successful Selling-Team members according to the model developed for the commercial COMPETITIVE ENVIRONMENT.

The Selling Team can be self-managing. The protracted time duration of the sales process allows the reporting function to be performed by the member of the Selling Team who performed the valued action contributing to the sale. Initially, only his report will be processed for each ASPECT instance of a CONTEST. However, any member of the team could submit a challenging ASPECT report. In this case a different filtering process is employed to select the representative ASPECT report. A peer review process is used by team-members to choose the representative report from contending reports. This self-managing feature insures that the rules of the reward system govern with no personal bias. This feature would enable a scenario where operational supervision of the sales compensation system resides with the Selling-Team members themselves, as shown in FIG. 12, thus eliminating an obstacle to making team operation a self-managing function. Self-managing the sales compensation process also teaches the Selling-Team members effective team behavior.

In this scenario, a Managing Third Party pre-determines a protocol for observing the selling process that enables the REPORTER to focus on the critical few PLAYER actions that contribute to a sale. A Managing Third Party would also set the value system for the REPORTER to use in judging the effectiveness of PLAYERs' actions. The protocol and value system of this preferred embodiment are described in U.S. patent application Ser. No. 09/571,874, filing date May 13, 2000, now U.S. Pat. No. 6,496,812. A Managing Third Party would also pre-determine the total sales compensation to be distributed among the Selling-Team PLAYERs. CONTEST results would be published for analysis by Selling-Team members and the Managing Third Party.

CONCLUSION

Exploiting the full potential of team synergy remains one of the most important opportunities of the twenty-first century. Doing so will improve team productivity and provide enormous economic and social benefit for mankind. Existing methods and systems for reporting team-member contributions to team achievement do not identify the critical few team-member actions; they do not segment the reporting task into ASPECTs that can be comprehended in real-time by a single reporter; and they don't teach a methodology for observing and reporting team-member collaboration. There is a compelling need in all areas of human endeavor for an effective method for valuing, measuring and reporting a team-member's contribution to the achievement of a team goal. This invention is a method and system for gathering and transmitting data to a central processor where it is processed to produce an analysis of team-member contributions to team achievement. It uses a team-member interaction protocol for viewing the team in action and incorporates a value system to help the REPORTER focus on the critical few ASPECTs of the CONTEST. The measurement process is made easier by allowing each REPORTER to focus on one ASPECT for his REPORTs. In return, he benefits from receiving the consolidated CONTEST report derived from all relevant ASPECTs of the CONTEST.

The use of a game metaphor adds entertainment value. It motivates the REPORTER to strive for judgment and measurement accuracy. The REPORTER receives feedback of his measurement compliance, enabling him to improve his insight and understanding of winning behavior. His expanding expertise is measured by a series of SKILL LEVELs. A connection between the REPORTER and the contest participants is created when the consolidated analysis is fed to the contest participants during an on-going CONTEST as input to the formulation of PLAYER strategy. The REPORTER indirectly becomes a participant in the CONTEST. This is the ultimate motivation for a REPORTER.

What is claimed:

1. A method for a plurality of reporters to collectively report team-member activity that is causal to team achievement, comprising the steps of:
 a) providing at least one data processor for receiving and processing report data;
 b) providing memory for storing report data;
 c) providing data entry device for inputting and outputting data;
 d) guiding said plurality of REPORTERs on how to collectively self-organize information gathering activities by displaying and committing REPORTERs intentions via said data entry device;
 e) creating a common perspective among the said plurality of REPORTERs to guide reporters' collective discovery of valued team-member actions by team-member interaction;
 f) creating among the plurality of REPORTERs, consistent measuring and valuing of team-members' contributions by processing report data on said at least one data processor;
 g) creating composite reports of valued team-member actions, storing and retrieving said composite reports from said memory;
 h) recording redundant reports via data entry device and selecting a representative report from each set of redundant reports by said at least one data processor;
wherein said at least one data processor, memory and data entry device are connected to a data communications network to process, store and communicate data, and
wherein the plurality of reporters then uses the data to collectively self-organize to share tasks of role selection, information discovery and information reporting, thereby integrating activity to simulate one omniscient information gatherer.

2. The method of claim 1, further comprising:
 i) aggregating said representative reports to create composite reports by said at least one data processor; and
 j) deterring hostile attempts to report false data by filter means.

3. The method of claim 1, further comprising:
 k) refining reporting skills by re-enforcement learning including:
 i) apprising reporter of reporting accuracy in relation to a standard by report quality feedback means;
 ii) establishing a reporter's reputation for reporting by proficiency skill level means; and iii) sharing reporters' knowledge and observations by collaboration means.

4. The method of claim 1, wherein the boundary of the CONTEST is extended to include REPORTERs as participants in the on-going CONTEST by providing PLAYERs with real-time feedback of the effectiveness of actions, further comprising:
   l) integrating and reporting of CONTEST analysis to CONTEST PLAYERs for re-enforcement learning to guide action choices during a CONTEST.

5. The method of claim 1, wherein PLAYERs rely solely on peer-to-peer collaboration in pursuit of the team goal; and further, said reporting is accomplished by the PLAYERs.

6. The method of claim 1, further comprising:
   m) developing refinements to existing ASPECTs or discovering additional valuable ASPECTs previously not uncovered, for modification of the reporting measurement rules by reporter collaboration means.

7. A system for a plurality of reporters to collectively report team-member activity that is causal to team achievement, comprising:
   a) at least one data processor for receiving and processing report data;
   b) a memory for storing report data;
   c) a data entry device for inputting and outputting data;
   d) signup commitment means for guiding said plurality of REPORTERs on how to integrate information gathering activities by displaying and committing REPORTERs intentions via said data entry device;
   e) team-member interaction protocol means for creating a common perspective among said plurality of REPORTERs to guide reporters' collective discovery of valued team-member actions;
   f) team goal-achievement value system means employed by the plurality of REPORTERs to create consistent measuring and valuing of team-members' contributions by processing report data on said at least one data processor;
   g) means for recording report data and create composite reports, storing and retrieving said composite reports from said memory;
   h) means for recording redundant reports in memory via data entry device and selecting a representative report from each set of redundant reports by said at least one data processor;

wherein said at least one data processor, memory and data entry device are connected to a data communications network to process, store and communicate data, and wherein the plurality of reporters the uses the data to collectively self-organize to share tasks of role selection, information discovery and information reporting, thereby integrating activity to simulate one omniscient information gatherer.

8. The system of claim 7, further comprising:
   i) means for aggregating said representative reports via said at least one data processor,
   j) means for deterring hostile attempts to report false data.

9. The system of claim 7, further comprising:
   k) refining reporting skills by re-enforcement learning means including;
      i) apprising reporter of reporting accuracy in relation to a standard by report quality feedback means via said data entry device;
      ii) establishing a reporter's reputation for reporting by proficiency skill level means; and
      iii) sharing reporters' knowledge and observations by collaboration means.

10. The system of claim 7, wherein the boundary of the CONTEST is extended to include REPORTERs as participants in the on-going CONTEST by providing PLAYERs with real-time feedback of the effectiveness of team-member actions, further comprising:
   l) integrating and reporting of CONTEST analysis to CONTEST PLAYERs for re-enforcement learning to guide action choices during a CONTEST.

11. The system of claim 7, wherein PLAYERs rely solely on peer-to-peer collaboration in pursuit of the team goal; and further, said reporting is accomplished by the PLAYERs.

12. The system of claim 7, further comprising:
   m) developing refinements to existing ASPECTs or discovering additional valuable ASPECTs previously not uncovered, for modification of the reporting measurement rules by reporter collaboration means.

* * * * *

UNITED STATES PATENT AND TRADEMARK OFFICE
CERTIFICATE OF CORRECTION

PATENT NO. : 7,153,211 B2  
APPLICATION NO. : 09/902333  
DATED : December 26, 2006  
INVENTOR(S) : Philip James Capaigne Page 1 of 1

It is certified that error appears in the above-identified patent and that said Letters Patent is hereby corrected as shown below:

On Title page, item [73] should read as follows:

--Object Power, Inc., Harvard, MA (US)--

Signed and Sealed this

Sixth Day of February, 2007

JON W. DUDAS  
*Director of the United States Patent and Trademark Office*